United States Patent [19]

Langley

[11] Patent Number: 4,967,153
[45] Date of Patent: Oct. 30, 1990

[54] EDDY CURRENT TURBOMACHINERY BLADE TIMING SYSTEM

[76] Inventor: Lawrence W. Langley, 910 Cardinal Dr., Christiansburg, Va. 24073

[21] Appl. No.: 375,738

[22] Filed: Jul. 5, 1989

Related U.S. Application Data

[62] Division of Ser. No. 904,979, Sep. 8, 1986, Pat. No. 4,847,556.

[51] Int. Cl.$^5$ .......................... G01P 3/48; G01P 3/54; G01B 7/14; G01M 1/00
[52] U.S. Cl. ............................... 324/174; 324/207.26; 73/660; 340/683; 364/550
[58] Field of Search ............... 324/173, 174, 166, 168, 324/207, 208, 226, 262; 73/660, 661; 340/683, 686; 364/431.02, 565, 550, 551.02

[56] References Cited

U.S. PATENT DOCUMENTS

| | | | |
|---|---|---|---|
| 3,058,339 | 10/1962 | Shapiro | 73/660 |
| 3,065,412 | 11/1962 | Rosenthal . | |
| 3,467,358 | 9/1969 | Zablotsky et al. | 73/660 |
| 3,530,323 | 7/1970 | Applequist | 324/174 |
| 3,896,608 | 7/1975 | Garrett | 324/226 |
| 3,932,813 | 11/1976 | Gallant | 324/173 |
| 4,153,388 | 5/1979 | Naegeli et al. | 416/61 |
| 4,326,804 | 4/1982 | Massey | 356/375 |
| 4,439,228 | 3/1984 | Rickman, Jr. | 324/164 |
| 4,518,917 | 5/1985 | Oates et al. | 324/207.25 |

OTHER PUBLICATIONS

O'Brien et al, "Non-Contacting Method for Measurement of Dynamic Blade Motions in Axial-Flow Compressors", ISA 1981, pp. 279-291.

*Primary Examiner*—Walter E. Snow

[57] ABSTRACT

A system combining a transducer and a signal processing circuit measures the clearance distance from the transducer to an electrically conductive moving part of a machine. The transducer contains a magnet and a coil, both coupled magnetically to a region traversed by the machine part. Eddy currents are induced in the part as it passes through the magnetic field of the transducer. These currents produce a field which moves with the part and generates a characteristic signal in the transducer coil. Amplitude and timing attributes of the signal are measured by the signal processing circuit. An experimentally derived mathematical function which relates the amplitude and timing of this signal to the clearance distance between the transducer and the moving part is used to compute the clearance distance. During this calculation useful information is also developed about the speed and transit time of the moving part. The system is adapted to turbomachinery blade condition monitoring.

6 Claims, 4 Drawing Sheets

EDDY CURRENT TURBOMACHINERY BLADE TIMING SYSTEM

This application is a division of Ser. No. 904,979 filed Sept. 8, 1986, now U.S. Pat. No. 4,847,556.

Turbomachines of all kinds are most efficient when they operate close to limits imposed by their materials, mechanical clearances and by flow instabilities. It is vitally important to monitor the dynamic stresses and other conditions of critical machine components during operation so that these limits can be approached with safety and reliability. The rotating blades of a turbomachine are its most highly stressed components, but it is difficult to measure the dynamic conditions of these blades because they are rotating.

The rotating blade conditions whose measurement would be valuable in monitoring and controlling a turbomachine are (1) end or side clearance, (2) vibration and flutter, and (3) untwist. Rotating turbomachinery blades have been instrumented for all of these, but the sensors used to date have all been unsuitable for long term monitoring, or deficient in other respects.

Blade clearances may be measured statically or during turbomachine operation by conventional sensors of several types. For example, variable inductors and variable capacitors are mentioned by I. E. Zablotsky et al in U.S. Pat. No. 3,467,358, in a system for indicating vibrations in turbomachinery. These types of sensors are well adapted to the desired measurement, but their signals are subject to drift and have other known limitations. Variable inductance probes require that the turbomachinery blades be made of a ferrous or other magnetic material, and are limited in their application to a fraction of machines in service. Their frequency response is severely limited by their inductance. Variable capacitance probes are limited in the range of clearance distances they can transduce and are subject to long term degradation by particulate and chemical contaminants in the fluid stream They also require low capacitance per unit length cabling and are sensitive to capacitance variations in the cables.

Conventional eddy current sensors may also be used for the measurement of clearance distances in a turbomachine. In their 1981 ISA paper, "Non-Contacting Method For Measurement of Dynamic Blade Motions in Axial-Flow Compressors", Walter F. O'Brien et al describe the use of commercial sensors purchased from the Bently-Nevada Corporation to measure blade clearances and vibrations in an experimental compressor fan rig. U.S. Pat. No. 4,518,917, issued to Robert M. Oates et al, describes similar sensors as part of a system for monitoring turbine blading.

Turbomachinery blade clearances have also been measured by using laser probes. For example, in U.S. Pat. No. 4,326,804, Paul W. Mossey describes a system for optical clearance distance determination, including purging means for keeping the optics clean. Such means are necessary because the optical probe must operate in a high speed stream containing corrosive gases and abrasive particulates. These are both likely to degrade the performance of optical elements such as mirrors and lenses.

In U.S. Pat. No. 4,384,819, Peter D. Baker discloses a turbomachinery blade clearance measuring system which uses microwave radiation. This system is well adapted to the environment of a turbomachine, but is intricate, expensive, and subject to drift.

Vibration, flutter and untwist can be measured in a turbomachine by any of the probes mentioned above. For example, U.S. Pat. No. 4,153,388 issued to John P. Naegeli describes a system which uses inductive pickups for detecting unwanted vibrations of turbomachinery blades. Any of the detection methods described so far can be used for this purpose because the timing of signals they produce is indicative of the dimensions of interest.

During the development of turbomachines it is common to mount strain gauges on the blades themselves and use slip rings coaxially mounted with the machine shaft to carry their signals to fixed instruments. However, this type of blade condition monitoring system is expensive and requires components which can endure the internal conditions of the machine. It is not generally suitable for long term machine monitoring.

It has been learned that important information about incipient or actual flow instabilities may be derived from blade operating conditions. Rotating stall in a compressor, for example, may be detected by a system which measures blade vibration. Such a detection system makes it possible to operate the machine closer to the limit imposed by stall, where efficiency and performance are generally greater.

There are many instances in machine development and test when it would be valuable to have real-time measurements of dynamic blade operating conditions. While existing sensors have the capability of performing this function at ordinary operating speeds, the advanced machines under development operate at higher tip speeds and blade rates, smaller clearances and higher temperatures. These conditions make it difficult or impossible to use existing sensors to gather the needed information.

In U.S. Pat. No. 4,439,728, issued to James D. Rickman, Jr., a system for measuring the speed of a turbomachine through the fixed housing of the machine is disclosed. The basic principle of the transducer used by Rickman was disclosed earlier by Louis Rosenthal in U.S. Pat. No. 3,065,412. Rosenthal pointed out that the amplitude of the signal induced in a coil by a conductive object passing through the static magnetic field of the invention is influenced by many factors; particle size, flux density, coil turns, particle permeability, air gap spacing and velocity. He did not teach how to use these signals to measure anything about the particle, probably because of the number of factors influencing the signals and their complex inter-relationships. Rickman uses only the frequency of the signal to measure speed of the turbomachine rotor. Others who have used the configuration of Rosenthal for conductive article detection, without making further use of information inherent in the signals, are Roy A. Applequist (U.S. Pat. No. 3,530,323) and William L. Garrott (U.S. Pat. Nos. 3,896,608 and 3,964,042).

Judging from the activity in this field, i.e. the number of types of transducers which have been developed and tried, it is apparent that measurement of turbomachinery blade conditions during machine operation, in a manner suitable for long term monitoring, is an important and unsolved problem.

SUMMARY OF THE INVENTION

My invention combines an eddy current transducer, improved over the construction of Rosenthal, with novel signal processing circuits and software to achieve useful measurements of turbomachine blade dimensions such as clearance and transit time. The amplitude of the signal produced by the transducer is a function of both machine speed and clearance distance. The repetition rate of the signal is indicative of machine speed. The relationship between the signal attributes of repetition rate and amplitude and the dimension of clearance is well-defined and repeatable, so it is possible to extract the dimensions of clearance and transit time, achieving an accurate measure of each. This process is facilitated by the fact that signals from the transducer are robust and low in noise content. This combination of an eddy current transducer and special signal processing circuit comprises a system which is well adapted to the measurement of blade clearance and blade transit time for research of long term machine monitoring and control.

DETAILED DESCRIPTION OF THE INVENTION

Figure 1:
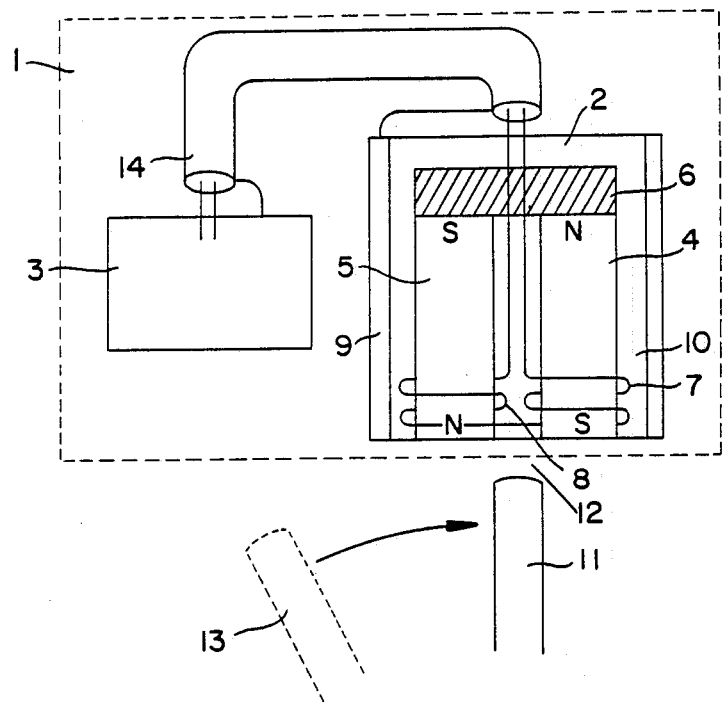
FIG. 1 is a schematic view of an eddy current transducing system constructed according to the invention.

FIG. 1 is a schematic view of a preferred embodiment of the subject transducing system. The system 1 comprises a novel eddy current transducer 2 and a signal processing circuit 3, interconnected by a shielded cable 14. The transducer 2 comprises magnets 4 and 5 with flux bridge 6, and coils 7 and 8, all contained within a housing 9, which is filled with an encapsulant 10. Magnets 4 and 5 are Neodymium-Iron-Boron magnets with an energy product of 35 MGOe. Flux bridge 6 is made of 1010–1020 cold rolled steel. Coils 7 and 8 each consist of 10 turns of #41 double Formvar insulated magnet wire. Housing 9 is a turned brass tube 0.375 inches in outside diameter with wall thickness of 0.025 inches, 1.5 inches long. Encapsulant 10 is a clear epoxy resin. The transducing system is shown in a typical orientation relative to a moving turbomachine blade 11 made of electrically conductive material such as titanium.

Magnet 4 is oriented with its North pole adjacent to the flux bridge 6. Magnet 5 is oriented with its South pole adjacent to the flux bridge 6. The combination of magnets 4 and 5 and flux bridge 6 produces a static magnetic field in the region 12 traversed by the blade 11, adjacent to and between the South pole of magnet 4 and the North pole of magnet 5. The shape of this field and its extent are as described by Herbert C. Roters in Chapter 5 of his textbook "Electromagnetic Devices", published by Wiley. FIGS. 6a and 6b of the reference are particularly illustrative of the lines of force and the equipotential lines of the field of such a bipolar magnet.

In the absence of any moving conductive objects in the region 12, the field of magnets 4 and 5 will be invariant with time. Thus the field encompassed by coils 7 and 8 will be constant, and no voltage will be produced at the input of signal processing circuit 3.

The effect of blade 11 on the field, and the voltage produced by its motion in the coils 7 and 8, are best understood by visualizing that the blade is initially in a position 13, moving toward and through the position 11 illustrated. As the blade intercepts field lines of the magnet, eddy currents will be induced in the conductive material of the blade. These currents will flow in the body of the blade in a manner which will tend to produce an opposing field; i.e., one with lines opposite in sense to those of the magnets 4 and 5. The induced magnetic field of the blade, produced by relative motion between the conductive blade material and the fixed magnetic field of the magnets, moves with the blade. Thus it moves relative to the coils 7 and 8. The strength of the induced magnetic field varies as the blade intercepts first a low density of magnetic lines, then greater as it intercepts a higher density passing close to the magnets 4 and 5, and again lower as it intercepts a lower density of lines further away from the magnets.

Figure 2:
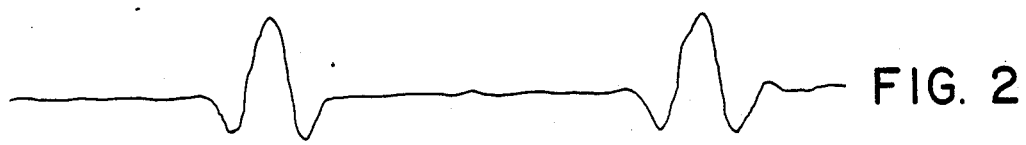
FIG. 2 shows the signals produced by an example transducer in a turbomachine operating at 31% of full speed.

The voltage induced in each of the two coils 7 and 8 is proportional to the rate of change of the magnetic field intensity, integrated over the area of each coil. As the induced field of the blade approaches, the intensity in the region of the coil increases and a voltage of a first polarity is produced. At the point where the blade is directly under the coil center, the magnetic field intensity reaches a maximum and the voltage falls to zero. A voltage of opposite polarity is then produced for the remaining travel of the blade past the center of the coil. Coils 7 and 8 are physically displaced along a line parallel to motion of the blade and are connected in series, so when the two voltage peaks of coil 7 are electrically summed with the two voltage peaks of coil 8, the waveform of FIG. 2 is the result. First a negative voltage peak is produced primarily by coil 8, then a positive voltage peak is produced by the combined voltage peaks of coil 7 and 8, and finally a negative voltage peak is produced primarily by coil 7. The composite waveform reaches its positive peak at the time of transit, when the blade 11 is centered between the coils.

Because the voltage output of both coils is proportional to the rate of change of field, the output signal amplitude of the transducer 2 will vary with the speed of blade motion. To a good approximation the signal amplitude will be proportional to speed. However, the signal amplitude will also be a function of other system constants and variables. A second most significant variable is the clearance; the distance from the end of the blade to the pole faces of the magnets and the coils of the transducer.

This distance effects the coupling between the magnets and the conductive material of the blade as well as the coupling between the coils and the induced field of the blade. As the clearance distance is increased, the signal amplitude will be decreased, approximately as the inverse square of the distance.

Figure 3:
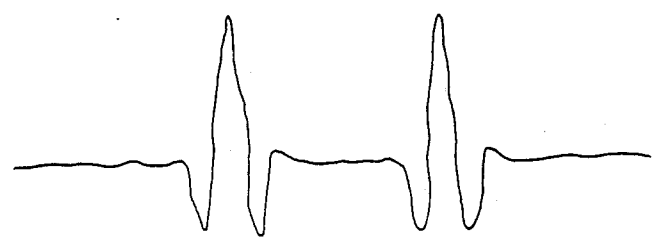
FIG. 3 shows signals from the same transducer at 53% of full speed.
Figure 4:
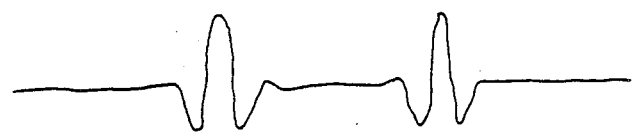
FIG. 4 shows signals at 53% of full speed, with the transducer displaced 0.015 inches further away from the turbomachine blade tips than in FIG. 3.

FIGS. 2, 3 and 4 show how the signals from the transducer vary with speed and clearance distance. In FIG. 2 the blades pass at an initial distance close to the transducer, and the machine is operated at 31% of full speed. Two peaks are illustrated, each produced by transit of a single blade. The peaks are of the same amplitude, an indication that the blades have identical clearance distances. FIG. 3 shows the signal produced in the same initial distance, but with the machine operating at 53% of full speed. Note that the signal amplitude is increased and the spacing between peaks is reduced, while the shape of each individual signal peak is unchanged. FIG. 4 shows the result of increasing the clearance distance (by moving the transducer away from the initial position or by reducing the blade length) while maintaining the machine speed. The amplitude of the signal is reduced, but the spacing between peaks is the same as in FIG. 3. These figures illustrate that information about both speed and clearance distance is contained in the signals, albeit the two are coupled together.

Figure 5:
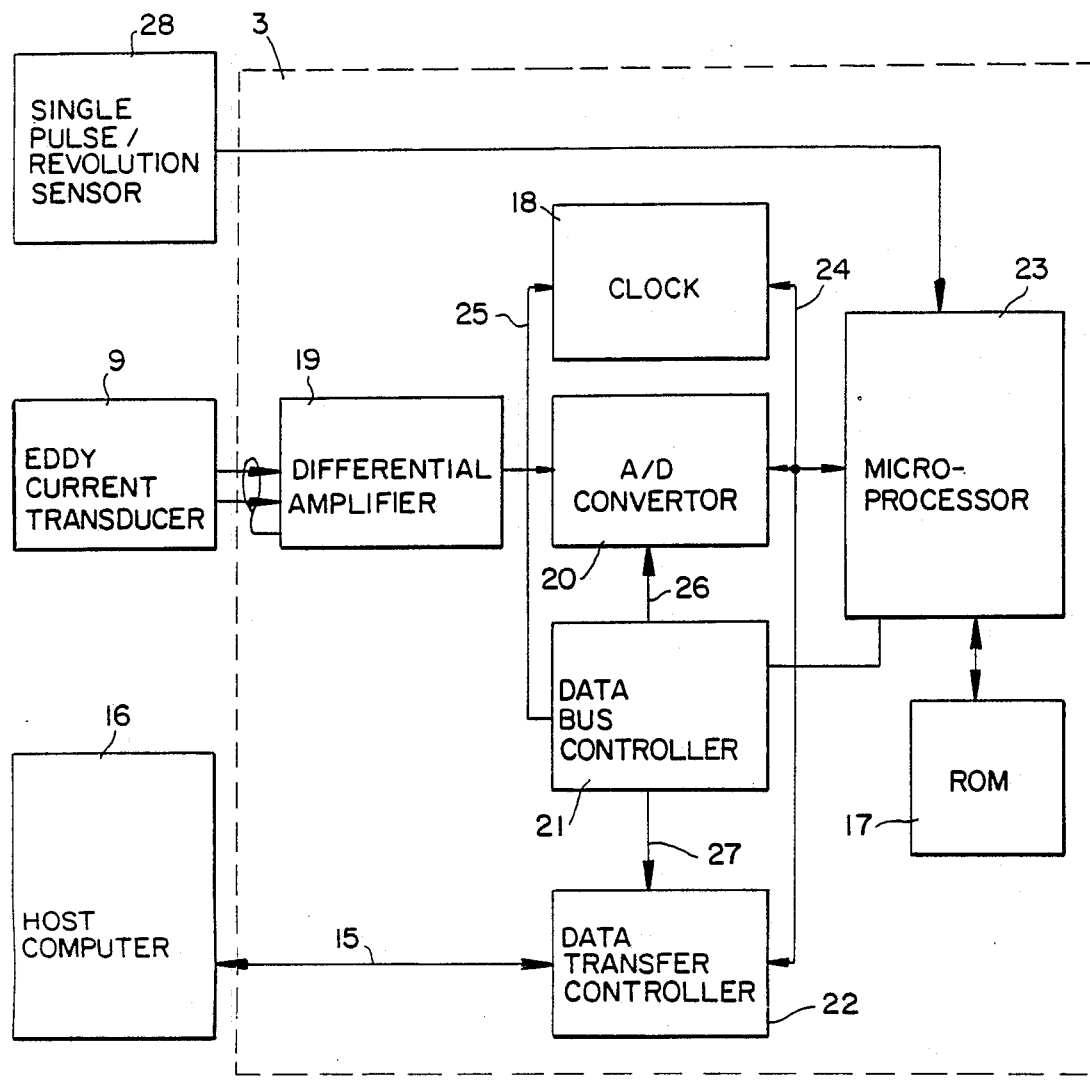
FIG. 5 is a block diagram of the signal processing circuit used in the subject transducing system.

FIG. 5 is a block diagram of the circuits represented by block 3 of FIG. 1. Signal Processing Circuit 1 comprises a microprocessor 2 with associated external read-only memory 17, a high frequency clock 18, differential amplifier 19, analog-to-digital convertor 20, data bus controller 21 and data transfer controller 22. The coils of eddy current transducer 9 are connected to amplifier 19, which is preferably a wideband, low drift differential dc amplifier. The output of amplifier 19 is a single-ended analog signal like the signals of FIGS. 2, 3 and 4, with amplitude matching the input range of analog-to-digital convertor 20. The analog-to-digital convertor 20 is preferably a high speed sampling convertor. It operates under direct control of the microprocessor 23, which is connected to the convertor 20 by a sixteen bit wide data bus 24. Also connected to the data bus 24 are the clock 18 and the data transfer controller 22. The microprocessor controls the flow of information on the data bus 24 by means of the bus controller 21 which has control lines 25, 26, and 27 respectively to the clock 18, convertor 20 and data transfer controller 22. The program which controls operation of this signal processing circuit is contained in read-only memory 17. Also connected to the Signal Processing Circuit 1 is a single pulse/revolution sensor 28, whose output pulse is used as a timing index for the turbomachine. This sensor is coupled directly to the microprocessor 23. A data link 15 is provided for communication of results to the Host Computer 16, under control of the data transfer controller 22.

The microprocessor 23 used in this circuit may be a Texas Instruments TMS32010, a unit designed for high speed signal processing. The analog-to-digital convertor 20 may be an Analogic ADAM 826-1 16-bit A/D convertor with integral sample and hold, capable of converting the output of amplifier 19 to a 16-bit number in 2.3 microseconds. The differential amplifier 19 may be a Dynamics Model 7525 DC to 2 MHZ Differential DC Amplifier. Other components are of conventional construction and are known to those skilled in the art.

Figure 6:
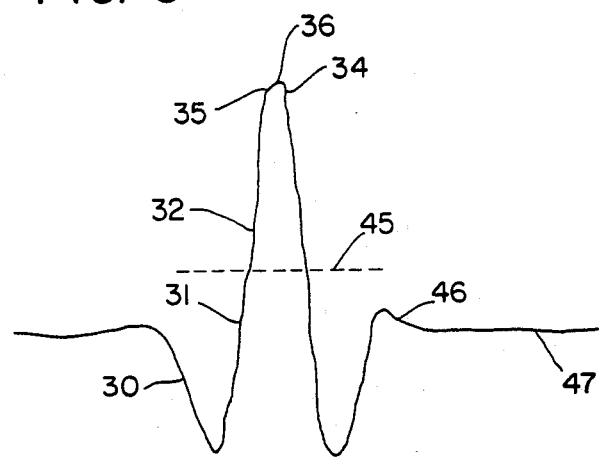
FIG. 6 shows attributes of the signal used by the signal processing circuit.
Figure 7:
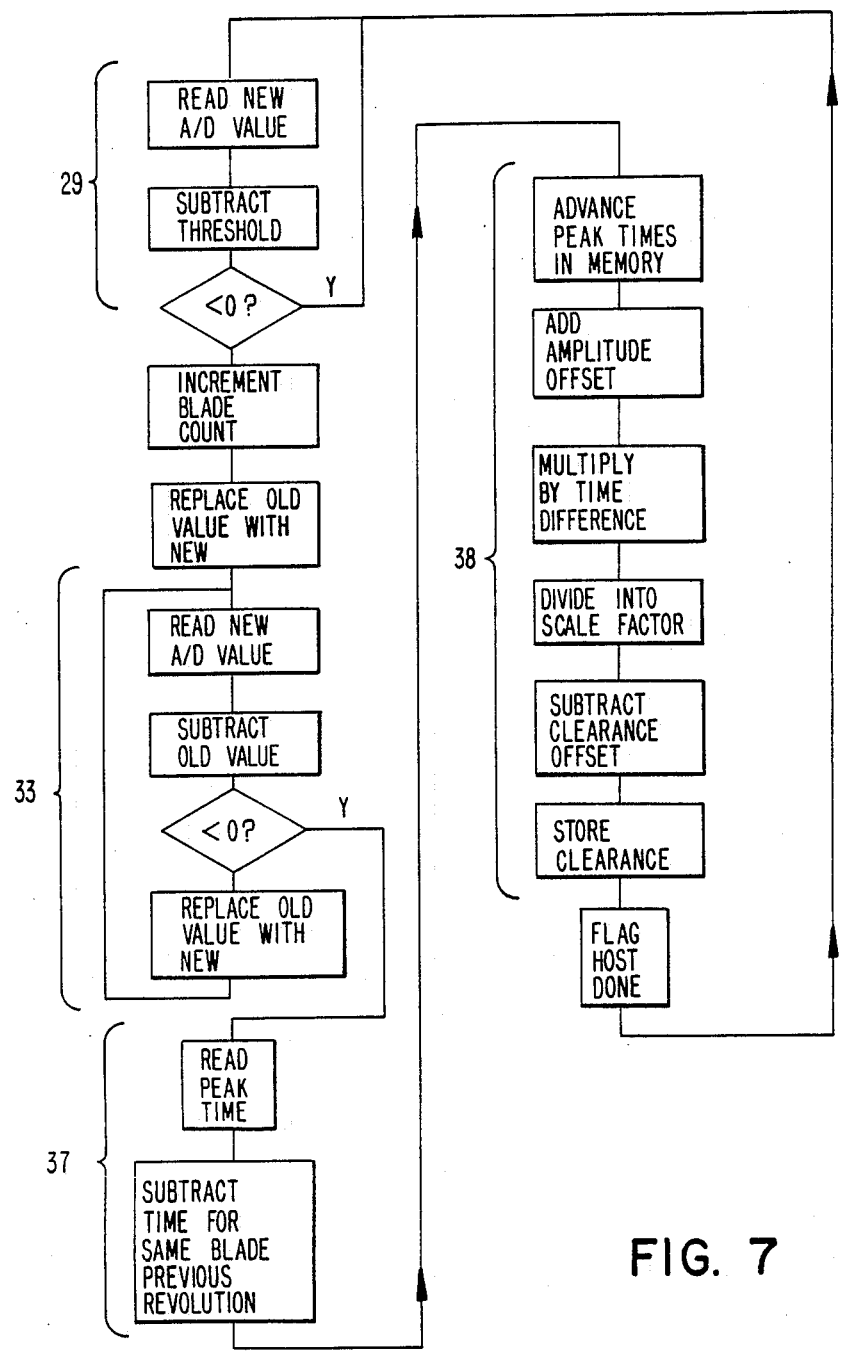
FIG. 7 is a flow chart of software for the transducing system.

The following description of operation for Signal Processing Circuit 1 refers to block diagram FIG. 5, to a typical blade signal as shown in FIG. 6, as well as to FIG. 7, a flow chart of system operation. An annotated software listing is also part of this disclosure, but is not explicitly referred to in this description. The software is representative of that which would be required in an Eddy Current Transducing System for a machine with 28 blades operating at 16,000 rpm.

The function of the Signal processing System 1 is to separate the dimensions of speed and clearance distance which are represented by the signals from the eddy current transducer. Speed is represented by the time delay between peaks of the blade signals. Clearance distance is computed from signal amplitude using the known dependence of amplitude on both speed and clearance distance. The computation requires measurements of the attributes of peak timing and amplitude for each blade signal, and these measurements are performed by the microprocessor.

Referring to the Flow Chart, FIG. 7, the Threshold Routine 29 consists of a loop in which the analog-to-digital convertor (20 in FIG. 5) is read, a predetermined threshold value 45 is subtracted from it and the peak Finding Routine is started if the result is negative. A positive result (30, 31, 46 or 47 in FIG. 6) will cause repetition of the reading and comparing process.

When a signal above threshold is detected, (32 in FIG. 6) a count of blades will be incremented, and the peak Finding Routine 33 will be entered. In this loop each new analog-to-digital value will be compared with the previous one. If the result is negative (34 in FIG. 6), the signal has decreased and a peak has been detected. A positive result (35 or 36 in FIG. 6) will cause repetition of the reading, comparing and replacement process.

Upon detection of a peak, the Time Delay Routine 37 will be entered. The function of this routine is to compute the period; the time delay between the blade peak just detected and the last peak detected for the same blade. The first instruction of this routine (MPROC in the software listing) reads the current value of the clock 18 (FIG. 5) into the microprocessor accumulator, thus timing the peak occurrence. An array of memory positions organized as a shift-register holds blade time measurements and advances them each time a blade is detected. This shift-register has the same number of positions as there are blades on the machine. Each position of the shift register holds the latest peak time measurement for a particular blade of the machine. After determining the period by subtraction of the oldest peak time value in the shift register from the new peak time value, the values in the shift register are advanced one position for use with the next blade.

When a peak has been detected and its time and amplitude measured, the Clearance Computing Routine 38 will begin. This routine calculates clearance distance using the formula;

$$C = \frac{4294967296}{(A + 1620)P} - 1384$$

Where $C$ = Clearance
$A$ = Amplitude
$P$ = Period

The constants in this routine are based on clearance distance in microns, amplitude in microvolts, and period in microseconds, using the experimental results described hereafter for the prototype transducer. The computation is carried out in double word precision, but the result is a single word value for clearance distance.

At the beginning of each machine revolution the blade count is zeroed by a routine labeled 'BLZER' in the software listing. This routine is started by the INTERRUPT SERVICE ROUTINE, which is evoked by the Single Pulse/Revolution Sensor 28. The Threshold Routine, labeled 'THRES' in the software listing, increments the blade count once for each blade. Thus the blade counter progresses through a number of states (its radix) equal to the number of blades in the machine, each state being associated with a particular blade.

The end result of the five routines which have been described is to produce values for blade number, transit time and clearance distance for each blade within a short time interval after the blade passes. These values, together with the single revolution delay value, can be passed to the host computer immediately after they are computed or on demand. The microprocessor can also keep an array of these values for all the blades of the machine, or accumulate statistics on times of arrival and clearance distance for transmission to the host computer on demand. Design of software for the performance of such additional functions is known to those skilled in the art, and is not considered to be within the scope of this invention.

ANNOTATED SOFTWARE SOURCE LISTING

In the listing below two macros are used, but detailed code for them is not included. The functions these macros perform are:

RIPPLE: Move data values one position forward in a 28 word array in data memory.

DWDIV: Read two double word quantities from data memory, divide the first by the second, and store the quotient in a double word space in data memory.

```
TITL                'EDDY CURRENT TRANSDUCER SIGNAL PROCESSOR'
IDT                 'ECSRUN'
AORG 200            STARTING LOCATION OF TABLE OF
*                   CONSTANTS IN PROGRAM MEMORY
DATA                1,65536,65536,32767,10000,1620,1384
*TABLE OF CONSTANTS; INCREMENTING FACTOR - D06
*                   DOUBLE WORD UPPER FS VALUE - D05
*                   DOUBLE WORD LOWER FS VALUE - DO4
*                   FULL SCALE VALUE - D03
*                   THRESHOLD VALUE -D02
*                   AMPLITUDE OFFSET - D01
*                   CLEARANCE OFFSET - D00
AORG 0
B                   INIT RESET ENTRY POINT
SST 50              INTERRUPT SERVICE ROUTINE
SACL 51
SACH 52
LAC 48              TEST START/RUN FLAG ("RUN" = 1)
BNZ BLZER           IF IN RUN, ZERO BLADE COUNT
LACK 1              IF NOT RUNNING, WHY NOT
SAC 48              SET FLAG ON "RUN"
B THRES             START RUNNING!
BLZER ZAC
SACL 43             ZERO THE BLADE COUNT
ZALH 52             RESTORE SAVED VALUES
ADDS 51
LST 50
EINT
RET                 RETURN TO INTERRUPTED PROGRAM
*                                THRESHOLD ROUTINE
THRES               IN 7,PA1 READ DATA FROM PORT #1
LAC 7
SUB 2               SUBTRACT THRESHOLD VALUE
BLZ THRES           IS SIGNAL ABOVE THRESHOLD
LAC 43                           INCREMENT BLADE COUNT
ADD 6
SACL 43
DMOV 7                        PEAK FINDING ROUTINE
*                   MOVE DATA VALUE FORWARD IN MEMORY,
*                   THEN LOOK FOR AMPLITUDE TO DECREASE
PKFND               IN 7,PA1 READ DATA FROM PORT #1
LAC 7
SUB 8               SUBTRACT PREVIOUS AMPLITUDE
BLZ MPROC           EXIT TO MAIN SIGNAL PROCESSING
*                   ROUTINE IF AMPLITUDE HAS DECREASED
DMOV 7              REPLACE OLD VALUE WITH NEW
B PKFND             LOOP
*                              MAIN SIGNAL PROCESSING
MPROC               IN 9,PA2 FETCH TIME OF PEAK FROM PORT 2
LAC 9
SUB 37              SUBTRACT TIME FOR SAME BLADE IN THE
*                   PREVIOUS REVOLUTION
SACL 38             STORE TIME DIFFERENCE
RIPPLE              28,9 MOVE STORED TIME VALUES AHEAD IN
*                   28 POSITION BLADE TIME ARRAY
LAC 7                            CALCULATION OF CLEARANCE
ADD 1               ADD OFFSET TO LATEST AMPLITUDE
SACL 44
LT 38               MULTIPLY TIME DIFFERENCE BY
MPY 44              CORRECTED AMPLITUDE, STORE RESULT
PAC
SACL 40
SACH 39
DWDIV               4,39,46 DIVIDE RESULT INTO FULL SCALE VALUE
LAC 46              CORRECT CLEARANCE BY OFFSET
ADD 0
```

-continued

| | |
|---|---|
| SACL 47 | STORE CORRECTED CLEARANCE VALUE |
| LARK 1 | SET "DONE" FLAG |
| SACL 53 | FOR HOST |
| OUT | 53,PA0 |
| B THRES | START LOOKING FOR NEXT PEAK |
| * | INITIALIZATION |
| INIT DINT | DISABLE INTERRUPTS, RESET |
| ROVM | OVERFLOW MODE, SELECT PAGE 0, ZERO |
| LARP 0 | ACCUMULATOR |
| LDPK 0 | |
| LACK 0 | |
| SACL 48 | SET START/RUN FLAG TO "START" |
| SACL 43 | ZERO THE BLADE COUNT |
| LARK 0,06 | SELECT DATA MEMORY FOR FIRST CONSTANT |
| READ TBLR * | TRANSFER CONSTANTS TO DATA MEMORY |
| ADD 05 | INCREMENT ADDRESS |
| BANZ READ | CONTINUE UNTIL LOADED |
| EINT | ENABLE INTERRUPTS |
| WAIT B | WAIT WAIT FOR INTERRUPT (TIMING INDEX) |
| END | |

CONSTRUCTION OF A TEST TRANSDUCER

The electromagnetic principles of the subject invention were experimentally verified with a prototype eddy current transducer. The transducer was constructed with two neodymium iron permanent magnets having an energy product of 35 million gauss-oersteds. Each magnet was 0.115 inches long parallel to the direction of blade travel, 0.150 inches normal to blade travel, and 0.500 inches long in the direction of magnetization. Ten turns of #41 enameled wire were wound around each magnet close to the end. The magnets were then bonded to a flux bridge, the coils connected in series to conductors of a shielded, twisted pair, and the magnet/coil assembly encapsulated within a 0.375 inch diameter brass tube with the cable attached to one end.

EXPERIMENTAL TEST OF THE TRANSDUCER

In order to measure the sensitivity and signal shape of the eddy current transducer of the subject invention, the prototype was tested on the first stage fan of a JT15D jet engine while it was operated on a fixed test stand. The particular engine on which these tests were performed has an aperture close to the mid-chord position of the first stage fan blades. This aperture had been sealed by a solid plug and it was a simple matter to fashion a replacement plug with a 0.375 inch diameter hole closely fitting the transducer outside diameter. Since it was not possible to move the compressor blades away from the transducer, clearance distance variation was simulated by moving the transducer relative to the blades, using a remote controlled actuator. Signals from the transducer were recorded with an RC Electronics Computerscope; a programmable digital storage oscilloscope. Because the transducer signals are inherently differential and their amplitude was expected to be only a few millivolts, a Dynamics Model 7521B high gain differential input preamplifier was employed. The amplifier, oscilloscope and actuator position control unit were all located in the test stand control room and cabled with shielded twisted pair to the engine.

To determine whether the Dynamics Amplifier might impose a bandwidth limitation on the sensor signals, the output at several speeds and clearance distances was subjected to a Fast Fourier Transform analysis. The results showed that the transducer signal does not contain high harmonics of the blade rate; the highest harmonic detected was the fourth, and it is well within the bandwidth of the amplifier.

ANALYSIS OF THE EXPERIMENTAL RESULTS

After each data recording session, the first step of analysis was to calculate speeds and average amplitudes for each record. These were plotted, and by linear regression a best fit straight line was found for each clearance distance value.

The next step was to fit the data to a system of equations by non-linear multiple linear regression analysis. This method of analysis requires an assumption of the relationship between the variables, along with initial value estimates for all constants. The form of equation postulated was:

$$V = B0 + \frac{(B1)S}{1 + (B2)D}$$

Where $V$ = Voltage - Millivolts
$S$ = Speed - RPM
$D$ = Clr. Distance - Inches
$B0, B1, B2$ - Constants to be determined The rationale for this relationship was:
(1) the data points for each clearance distance value appeared to fit a straight line;
(2) the straight lines for different clearance distance values tended toward a common origin, but did not intercept the speed axis at zero amplitude;
(3) there appears to be an inverse relationship between clearance distance and signal amplitude.

Two different curve fitting methods were used for each set of data; (1) the method of Marquardt and (2) the Gauss-Newton method. The two methods gave essentially the same results. The best prediction of data values was achieved by the coefficients:

| | |
|---|---|
| $B0 = -1.62$ | ($\pm 4\%$) |
| $B1 = 4.5 \times 10^{-4}$ | ($\pm 2\%$) |
| $B2 = 18$ | ($\pm 6\%$) |

The inverse of this equation can be used to indicate average or individual blade clearance distance from measured values of speed and signal amplitude.

$$D = \frac{(B3)S}{V - B0} - B4$$

Where $B3 = B1/B2$
$B4 = 1/B2$

Or, using the results of the analysis above, $$D = \frac{2.5 \times 10^{-5} S}{V + 1.62} - .055$$

Where

D is in inches
S is in RPM
V is in Millivolts

CONCLUSIONS FROM THE EXPERIMENTS

The following conclusions about the Eddy Current Transducer prototype were arrived at as a result of these experiments:

(1) transducer signal output is proportional to speed, with some indication of departure from linearity at 8500 rpm. This is a speed at which blade length would be expected to increase somewhat as a result of centripetal force. Signals were clearly resolved at peripheral speeds up to 779 ft/sec (Mach 0.71).

(2) transducer signal output increases as tip clearance distance decreases. The relationship between tip clearance distance and signal is approximately inverse, as indicated by the postulated formula.

(3) The output of the transducer is not unduly sensitive to the angle between the sensor axis and the axis of blade rotation.

(4) Signal levels of the prototype were in the 1 to 3 millivolt range between 5000 and 8500 rpm. The signal to noise ratio is better than 10 db at idle speeds, improving to better than 14 db at 8500 rpm. S/N ratios should continue to improve as speed increases, because the noise level is constant.

LIST OF EQUIPMENT USED IN THE EXPERIMENTS

Engine—pratt & Whitney JT15D Ser. No. 76027
Amplifier—Dynamics Model 7521B, Ser. No. 3639
Digital Recording Oscilloscope—RC Electronics Model APL-D2
Software—RC Electronics Scope Driver version 3.0.9

The first stage fan on which these experiments were performed has 28 blades and an outside diameter of 21 inches. The fan is rated at 16,000 rpm maximum. Blades are 0.090 inches thick at the tip, angled 20 degrees with respect to the plane of rotation. The material of the blades is titanium. Mechanical clearance between blade tips and housing is approximately 0.030 inches.

FEATURES AND ADVANTAGES OF THE INVENTION

Earlier in this disclosure it was pointed out that Rosenthal (U.S. Pat. No. 3,065,412) had listed a number of variables which affect the signal induced in a coil by a conductive object passing through a static magnetic field. Out of those listed, two are design parameters for the transducer; magnetic field strength and coil turns. Particle size is not a factor in a turbomachinery blade monitoring application, but the material and shape of the blade will affect the shape and duration of the signal. In a given machine these will not be changed, so the transducer output will represent only the dimensions of interest; clearance distance and speed.

The principal advantage of this sensor over the conventional eddy current sensor is that it does not rely on a high "Q" measurement circuit with a long time constant to detect eddy currents in the rapidly moving blade. Conventional eddy current sensors utilize such a circuit with an inductance whose "Q" is spoiled by proximity of the conductive blade material. The inductance is connected as a resonant element and driven in a manner which facilitates detection of the change in "Q". The signal frequency must be high enough so there are a large number of cycles during blade transit. The Eddy Current Sensor of the subject invention only has to produce one cycle per blade, therefore its bandwidth is more effectively utilized.

The transducer driving signal utilized for measurement of "Q" in the conventional eddy current sensor must be regulated closely in magnitude to maintain the accuracy of measurements. Two additional lead wires are required to deliver this signal to the sensor.

Another advantage of the subject Eddy Current Sensor is that there is essentially no power dissipated in the sensor itself. The field utilized to produce the eddy current signal is limited in magnitude only by available permanent magnet materials, and a field magnitude of 12,000 gauss is readily achieved. Furthermore, the permanent magnet sensor will not induce alternating fields in surrounding objects, and is relatively insensitive to the presence of adjacent conductive or magnetic materials.

The subject Eddy Current Sensor can function over the temperature range of an Alnico magnet, from cryogenic temperatures to 550 degrees Centigrade. It is possible to produce coils with ceramic insulation which will cover these temperatures. Sensors with a service temperature maximum of 550 degrees centigrade should be useful with any kind of compressor and with many turbine power stages, as well. With active cooling they would be applicable to all kinds of turbomachinery.

There is essentially no size limitation to the concept. Sensors can be made long and narrow to produce signals from the length of a turbine blade, or short to select only a part of the blade length. More than one sensor can thus be placed along the length of a blade to detect untwist.

Applications are throughout turbomachinery; anywhere a dynamic measurement of clearance distance and/or arrival time for a discontinuous conductive object is required, this type of sensor should be able to provide it. No other transducer principle is known which will meet the demanding requirements of turbine blade condition measuring and monitoring, therefore it is reasonable to expect that other machinery applications may be found.

VARIATIONS WITHIN THE SCOPE OF THE INVENTION

It will be appreciated that the subject invention is not limited to the system configuration described above, but may be employed in other configurations as well. Specific applications will, in fact, require a tailoring of the features of the invention to adapt to particular turbomachines and particular data requirements.

The type of magnet employed in the invention may any of those which are available commercially. Although the high energy Neodymium Iron magnet of the prototype is particularly advantageous in having a high flux density under the chosen operating conditions, other rare earth magnets or ferrite magnets may be substituted for Neodymium-Iron. The rare earth and ferrite materials have high volume resistivity, which is advantageous in sensing the small dynamic fields produced by eddy currents. Eddy currents within the bulk of the magnet tend to reduce the sensitivity of the transducer. It is even possible to use electromagnets, assuming that measures are taken to keep the driving currents constant and noise-free.

For higher temperature applications, up to 550 degrees centigrade, for example, alnico magnets may be substituted. These magnets are known for temperature stability, although they have a much lower coercivity than rare earths, and a greater length of magnet in the direction of magnetization may be required. The lower volume resistivity of alnico material will yield transducers of somewhat lower sensitivity, but this can be compensated for by changing the coil parameters.

While the prototype transducer was wound with ten turns per coil, the number of turns and the location of the coil or coils are subject to the choice of the designer and dependent on the requirements of an application. Coils with a small number of turns are advantageous in having an extremely low source impedance, which enables the transducer to drive the impedance of the cable readily. It may be beneficial to match the source impedance of the transducer to that of the cable for maximum power transfer and minimum reflection of energy at the connection point, but this is not necessary for operation of the invention. An increase in the number of turns will produce a greater signal voltage, as well.

Figure 8:
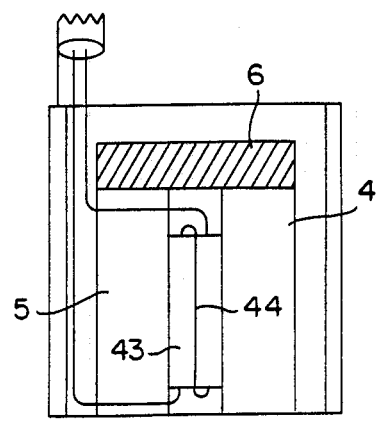
FIG. 8 shows an alternative coil location.

The coil configuration is also subject to design choice based on objectives for spatial sensitivity of the transducer. A broader pattern of sensitivity may be provided by placing a single coil in the air gap of the magnet as shown in FIG. 8. Here the magnets 4 and 5 are bonded to the flux bridge 6 in the same manner as shown in FIG. 1, but a non-conductive, non-magnetic spacer 43 is placed between the magnets. A single coil 44 is wound around this spacer. The area of the coil may be larger than that of coils around the pole faces, and a sensitivity to objects passing at a greater distance will be achieved. Other coil locations are possible, to achieve various design objectives such as enhanced sensitivity or a modified pattern of sensitivity Other dimensions of the transducer may be varied to modify its spatial pattern of sensitivity. For example, a transducer for use in steam turbines, where clearance distance may range up to 0.100 inches would have its dimension parallel to blade travel longer than one designed for small diameter compressors, where typical clearance distances would be one tenth as great. The magnet pole width may be increased in order to measure conditions of a wide blade, or the pole width may be reduced in order to place more than one transducer along the length of a blade for measurement of blade twist.

Figure 9:
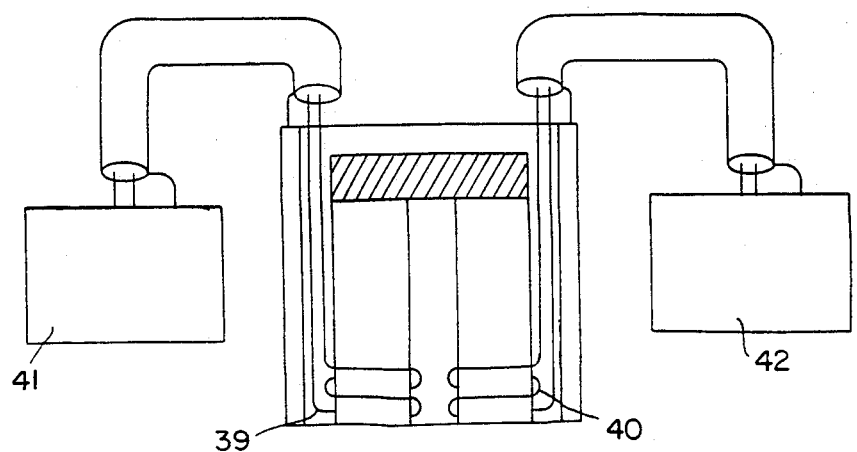
FIG. 9 shows an alternative configuration for coils and signal processing circuit.

It is also possible to produce a configuration such as that of FIG. 9, which has two separate coils 39 and 40, one on each pole of the magnet, producing different signals which can be compared or combined by separate signal processing units 41 and 42. The signal produced by one coil may be earlier in time than the other, and the difference used to measure blade twist. Alternatively the delay between signals from the two coils may yield a useful measurement of instantaneous velocity While the transducer of the invention has two poles and two coils, the principles it relies upon may be employed in transducers with more poles and any number of coils. The magnet poles and coils may be physically displaced along a line or lines parallel to the path of travel of the blade tip, or normal to its travel, in order to derive temporal and spatial information with greater precision or in more detail.

The signal processing circuit of the subject invention may use other attributes of the signals to detect blade conditions; the slopes, peak amplitudes other than that of the central peak, or zero crossing times. Multiple transducers or a multiple coil transducer connected to a single processing circuit may develop a velocity indication from a single blade, and this may be used to correct the signal level for that blade without relying on a time measurement between blades. As indicated earlier in the disclosure, the signal processing unit may perform additional functions such as storing values or statistics for individual blades, for later transmission to the host computer.

The software for use in the signal processing circuit of the subject invention may be written in any programming language and my reside in a programmable read-only memory or any other form of data storage medium. It may be downloaded from the host computer for execution, and may be modified during operation of the system. Any parameter used in measurements or computations may be modified before or during use.

While the invention has been described in a preferred embodiment, it may readily be seen that many useful variations and combinations of the elements described may be made without departing from the scope and spirit of the invention.

I claim:

1. A device for measuring the transit times of electrically conductive moving parts of a machine, comprising:
   (a) a magnet having two poles for producing a static field of magnetic flux in a region traversed by said moving parts;
   (b) a coil inductively coupled to said region for producing signals from the magnetic field of eddy currents in said moving parts;
   (c) timer means connected to said coil for measuring the times of said signals;
   (d) counting means for maintaining a count of said signals; and
   (e) means connected to said timer means and said counting means for storing said times in association with current values of said count.

2. The device of claim 1 in which the radix of said counting means is equal to the number of said moving parts.

3. A system for indicating the arrival times of individual blades in a blade row of a turbomachine, comprising:
   (a) a magnet having two poles for producing a static field of magnetic flux in a region traversed by said blades;
   (b) a coil inductively coupled to said region for producing signals from the magnetic field of eddy currents in said blades;

(c) timer means connected to said coil for measuring the times of said signals;
(d) counting means with radix equal to the number of blades in said blade row for maintaining a count of said signals;
(e) means connected to said timer means and said counting means for storing said times in association with current values of said count.

4. The device of claim 3 further comprising computing means for detecting deflections of said blades by comparing successive stored values of said times associated with individual values of said count.

5. The device of claim 3 further comprising computing means for detecting vibrations of said blades by comparing successive stored values of said times associated with individual values of said count.

6. The device of claim 3 further comprising computing means for detecting rotating stall in said turbomachine by comparing successive stored values of said times associated with individual values of said count.

* * * * *